(12) United States Patent
Faulkner

(10) Patent No.: US 11,511,470 B2
(45) Date of Patent: Nov. 29, 2022

(54) SLIDE GUIDANCE AND WEAR REDUCTION FOR INJECTION MOLDING

(71) Applicant: F&S Tool, Inc., Erie, PA (US)

(72) Inventor: James D. Faulkner, Erie, PA (US)

(73) Assignee: F&S Tool, Inc., Erie, PA (US)

( * ) Notice: Subject to any disclaimer, the term of this patent is extended or adjusted under 35 U.S.C. 154(b) by 376 days.

(21) Appl. No.: 16/801,986

(22) Filed: Feb. 26, 2020

(65) Prior Publication Data
US 2020/0269481 A1 Aug. 27, 2020

Related U.S. Application Data

(60) Provisional application No. 62/811,372, filed on Feb. 27, 2019.

(51) Int. Cl.
*B29C 43/00* (2006.01)
*B29C 45/40* (2006.01)
*B29C 45/37* (2006.01)

(52) U.S. Cl.
CPC ........ *B29C 45/4005* (2013.01); *B29C 45/376* (2013.01)

(58) Field of Classification Search
CPC ..... B29C 45/02; B29C 45/17; B29C 45/1742; B29C 45/1747; B29C 45/1761; B29C 45/2672; B29C 45/32; B29C 2045/326
See application file for complete search history.

(56) References Cited

U.S. PATENT DOCUMENTS

| 4,090,833 A | 5/1978 | Saidla |
| 4,172,872 A | 10/1979 | Nagai |

(Continued)

FOREIGN PATENT DOCUMENTS

| CN | 102452148 B | 3/2014 |
| CN | 204019904 U | 12/2014 |

OTHER PUBLICATIONS

International Preliminary Report on Patentability for International Patent Application No. PCT/US2020/19881, received from the International Bureau of WIPO, dated Aug. 31, 2021, 5 pages.

(Continued)

*Primary Examiner* — Joseph S Del Sole
*Assistant Examiner* — Thu-Khanh T. Nguyen
(74) *Attorney, Agent, or Firm* — The Marbury Law Group, PLLC

(57) ABSTRACT

A guidance system for a slide assembly for a mold for a plastic and/or silicone processing machine is presented. The processing machine comprises at least two mold halves with at least one slide assembly mounted to at least one mold half. The slide assembly is movable parallel to the plane of the parting line of the two mold halves and generally perpendicular to the direction of the plane of separation of the two mold halves after a part has been formed. The slide assembly comprises a carrier for holding cavity forming parts, gibs that secure the carrier to the mold half, and a series of rollers arranged to engage with the carrier such that the rollers roll with the movement of the carrier parallel to the parting line of the two mold halves. The rollers do not bear any of the compression force used to press the two mold halves together.

4 Claims, 4 Drawing Sheets

(56) References Cited

U.S. PATENT DOCUMENTS

| | | | |
|---|---|---|---|
| 4,929,166 A * | 5/1990 | DiSimone | B29C 45/32 |
| | | | 425/451.3 |
| 5,007,814 A | 4/1991 | Saunders et al. | |
| 5,454,709 A | 10/1995 | Leonhartsberger et al. | |
| 5,720,918 A | 2/1998 | Wollschläger et al. | |
| 7,588,437 B2 | 9/2009 | Clarke | |

OTHER PUBLICATIONS

International Search Report received in related International Application No. PCT/US20/19881 dated Jun. 8, 2020.

Written Opinion of the International Search Report received in related International Application No. PCT/US20/19881 dated Jun. 8, 2020.

Supplementary Extended European Search Report In Application No. 20763931.1-1014/3906143 PCT/US2020/019881 from the European Patent Office dated Sep. 7, 2022.

* cited by examiner

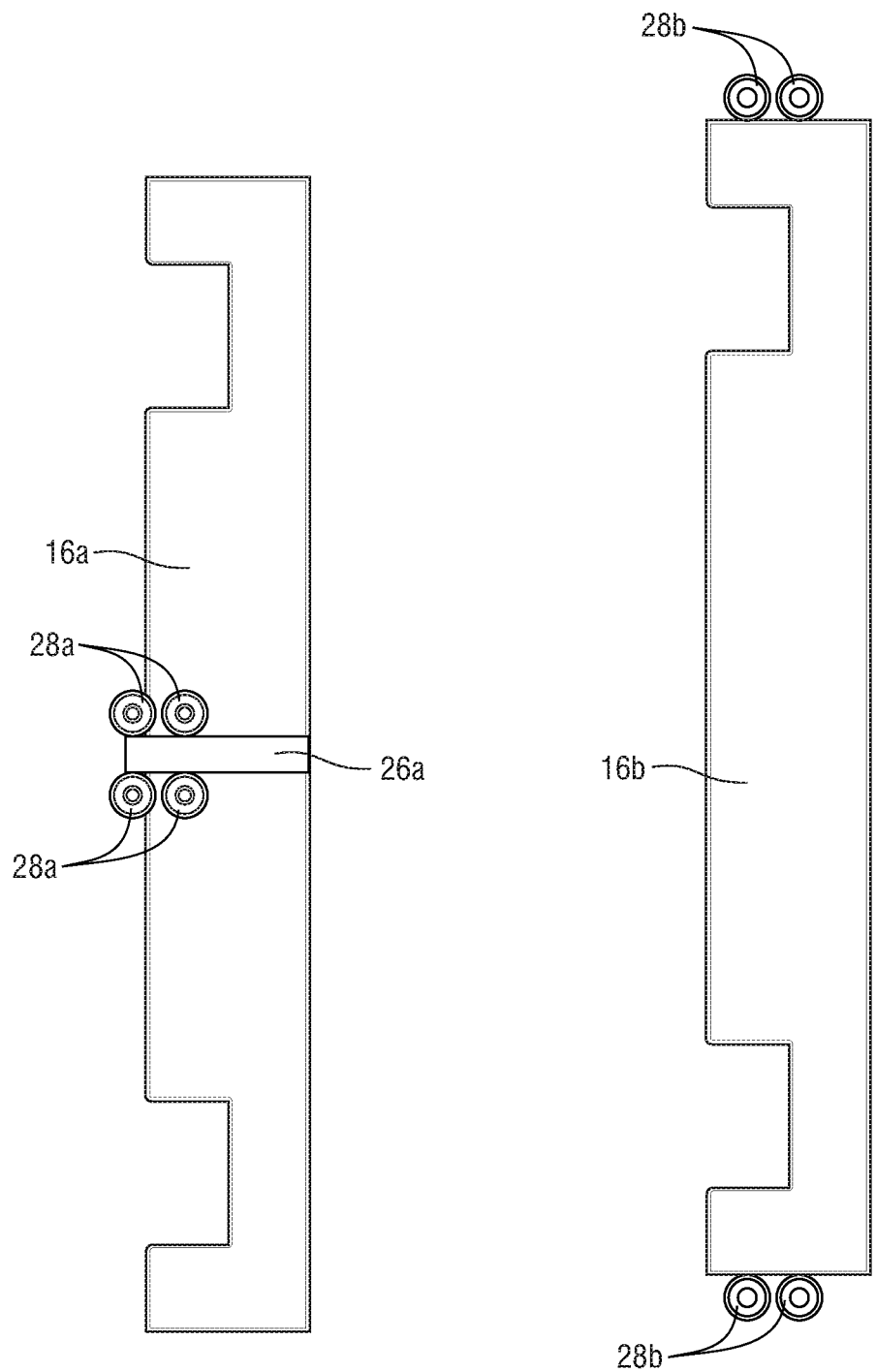

SLIDE GUIDANCE AND WEAR REDUCTION FOR INJECTION MOLDING

BACKGROUND

Injection molding is a manufacturing process for producing parts by injecting material into a mold. Injection molding machines comprise various components that work together to ultimately form a plastic or silicone part that is ejected from the mold. The basic parts of the mold are the cavity and ejector system. The mold comprises at least two mold halves within which the cavity is formed. When the two mold halves are closed, plastic or silicone is injected into the cavity to form the molded part. The mold halves are then split apart to remove or eject the finally molded part. To form more complex molded parts, additional movable and slidable elements on the mold halves operate to hold additional cavity elements and to release the finally molded part from the mold. The surfaces of these slidable elements are typically bound by surface to surface contact creating significant friction and wear. What is presented is an improved system to guide the movement of these injection mold components in an injection molding machine mold.

SUMMARY

What is presented is a guidance system for a slide assembly for a mold for a plastic and/or silicone processing machine. The processing machine comprises at least two mold halves with at least one slide assembly mounted to at least one mold half. The slide assembly is movable parallel to the plane of the parting line of the two mold halves and generally perpendicular to the direction of the plane of separation of the two mold halves after a part has been formed. The slide assembly comprises a carrier for holding cavity forming parts, gibs that secure the carrier to the mold half, and a series of rollers arranged to engage with the carrier such that the rollers roll with the movement of the carrier parallel to the parting line of the two mold halves. The rollers do not bear any of the compression force used to press the two mold halves together.

At least one cam bar may be mounted to the carrier. In such embodiments the rollers may engage with the cam bars to engage with the carrier. In other embodiments, the rollers may be located adjacent to the gibs to engage with the carrier. A wear plate may be mounted between the carrier and the mold half.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

FIG. 7 is a bottom view of another embodiment showing a carrier having a single cam bar; and FIG. 8 is a bottom view of another embodiment showing a carrier with no cam bars.

DETAILED DESCRIPTION

Figure 1:
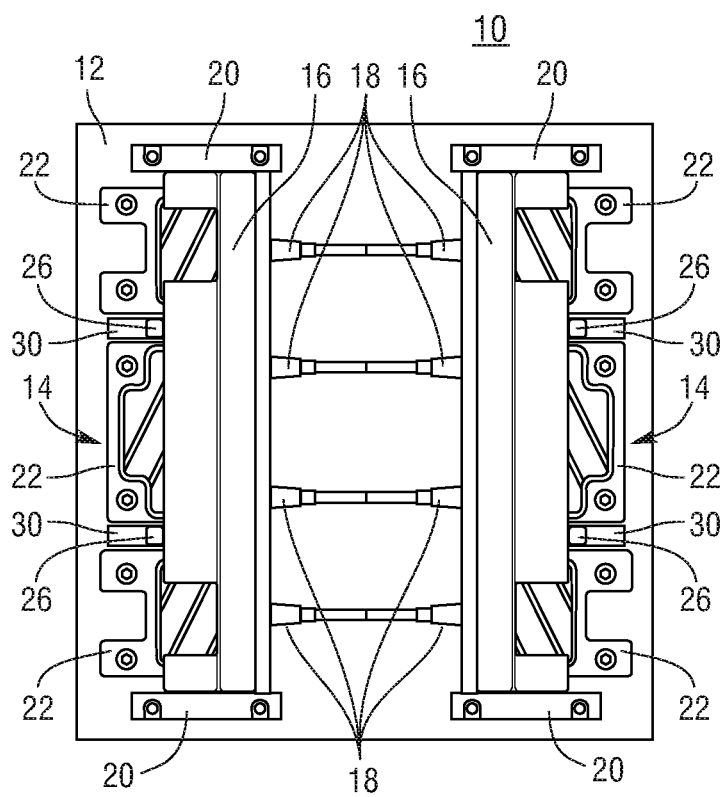
FIG. 1 shows a portion of one mold half of an injection molding system with the slide assembly in the closed position.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Plastic and silicone injection molding processing machines form molded parts based on the injection of liquid plastic or silicone into a cavity that is formed into at least two mold halves that separate at a parting line. During part formation, the two mold halves are compressed together to hold the cavities shut and to prevent the leakage of liquid plastic or silicone from between the two halves. The pressures exerted are typically high and parts that are not reinforced are prone to wear and damage. For more complicated parts, a slide assembly may be incorporated onto one or both mold halves to hold additional cavity forming parts. These slide assemblies are crafted and machined with care to prolong their life and usefulness.

For purposes of illustration, FIG. 1 shows a simplified portion of a plastic and/or silicone mold 10. Only one mold half 12 is shown while in reality, a second mold half would be pressing against this mold half 12 and forming a tight seal in preparation for the injection of plastic or silicone into the cavity. Furthermore, the cavity within the mold half 12 is also not shown to simplify the drawings. Each mold half 12 can hold at least one slide assembly 14, as in the example shown in FIG. 1, but it is understood that the mold halves 12 can hold as many slide assemblies 14 as may be arranged to fit on the mold half 12. The slide assembly 14 is in the closed position in FIG. 1. Each slide assembly 14 comprises a carrier 16 for holding cavity forming parts 18 and gibs 20 that hold the carrier 16 to the mold half 12. The cavity forming parts 18 shown in the figures are depicted merely for purposes of illustration. It will be understood that the actual form and design of the cavity forming parts 18 will be as necessary for the particular application.

Figure 2:
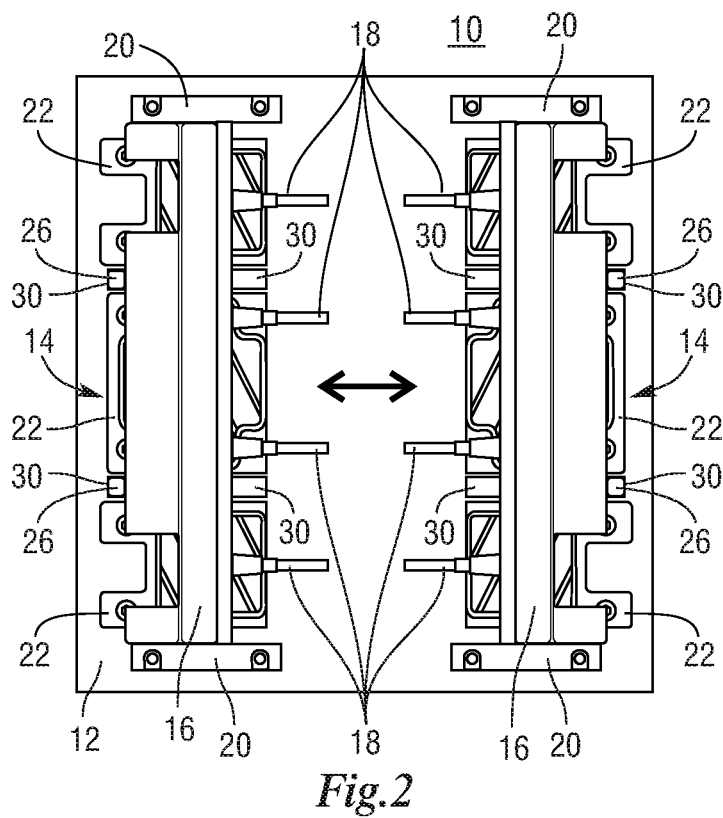
FIG. 2 shows the mold half of FIG. 1 with the slide assembly in the open position.
Figure 3:
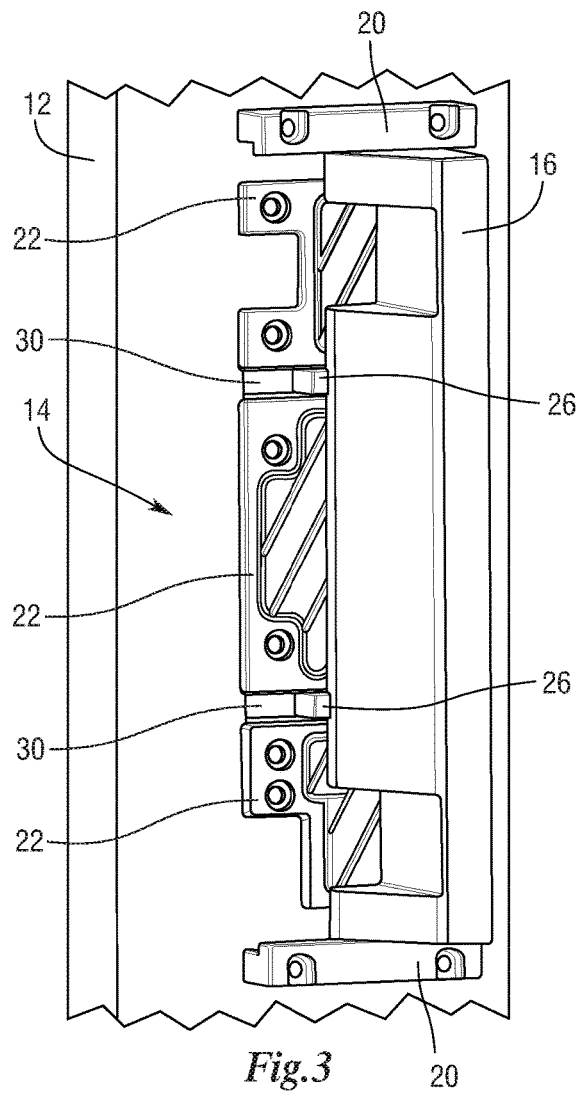
FIG. 3 is a close-up of one slide assembly of FIG. 1.

As best understood by comparing FIGS. 1 and 2, after the plastic or silicone is injected into the cavity, the two mold halves are pulled apart to eject the finally molded part. The slide assembly 14 also moves parallel to the plane of the parting line of the two mold halves and generally perpendicular to the direction of the plane of separation of the two mold halves after a part has been formed. The movement of the slide assemblies 14 can be actuated in several different ways. The slide assemblies 14 can be mechanically opened and closed using cam pins, horn pins, cam fingers, or delta cams. Alternatively, the slide assemblies 14 could be piston driven hydraulic or pneumatic systems or electric servo driven. Regardless of the means of movement, all slide assemblies 14 will benefit from the improvements disclosed herein, FIG. 3 shows a close-up of one of the slide assemblies 14 on a mold half 12. For purposes of illustration, the cavity forming parts are not shown. The carrier 16 is held in place on the mold half 12 with a pair of gibs 20. At least one wear plate 22 is mounted between the carrier 16 and the mold half 12. The carrier 16 slides on the wear plates 22 to reduce wear on the mold half 12 as the carriers 16 slide over them.

Figure 4:
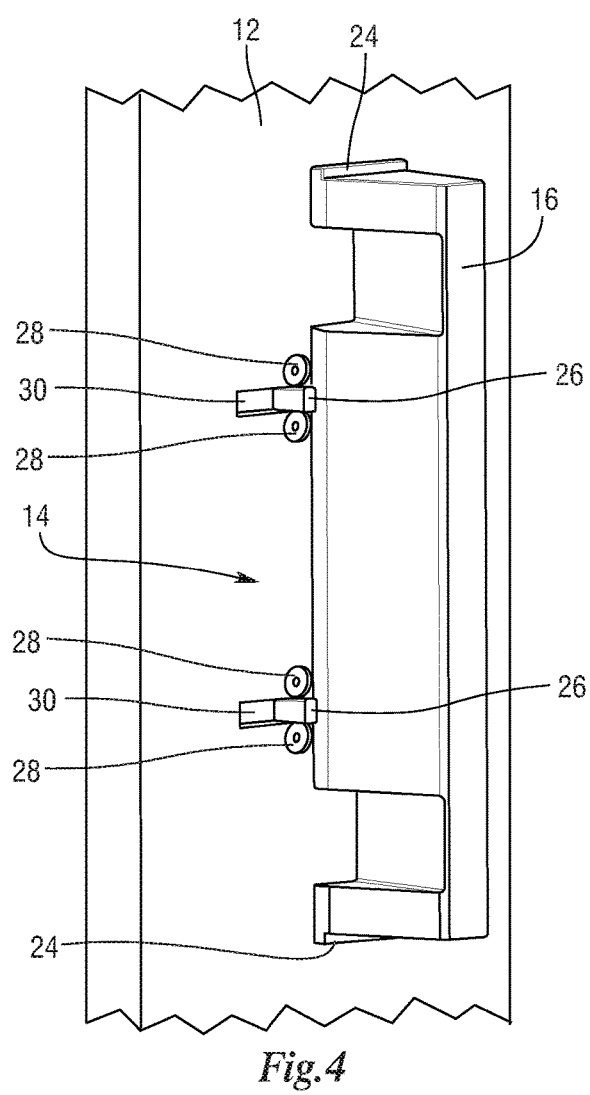
FIG. 4 is a view of some of the slide assembly components shown in FIG. 3.
Figure 5:
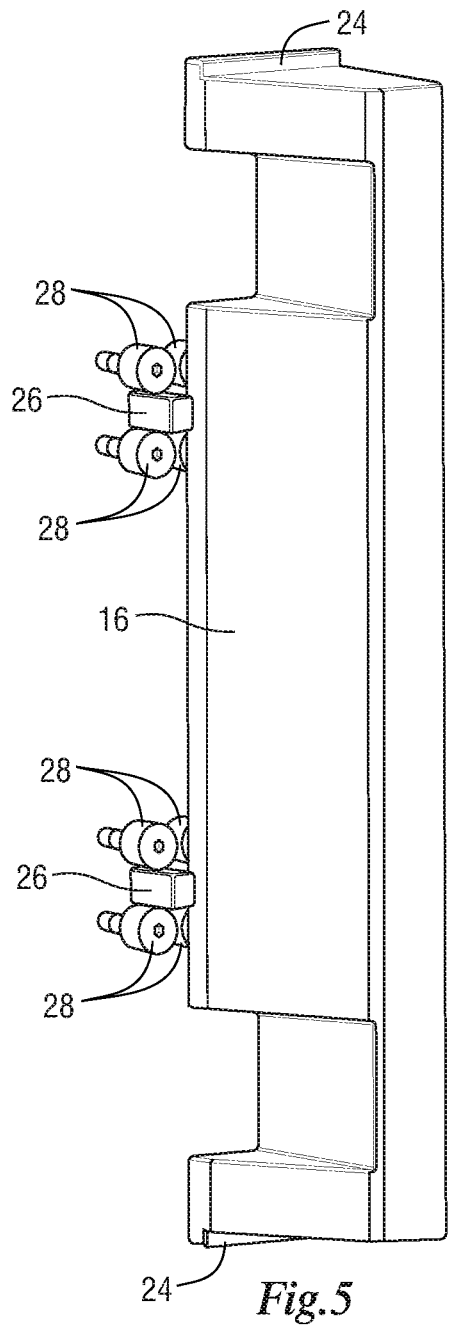
FIG. 5 is an isometric view of the carrier and select components shown in FIG. 4.

FIG. 4 shows the same slide assembly 14 of FIG. 3, without the gibs 20 and the wear plates 22. FIG. 5 shows an isometric view of the carrier 16 of FIGS. 3 and 4 with additional elements as will be described herein. As best understood by comparing FIGS. 3, 4, and 5, the carrier 16 has a lip 24 that fits under the gib 20 that allows the carrier 16 to be held against the mold half 12. In the embodiment shown, the carrier 16 has cam bars 26 that are mounted to the carrier 16. The cam bars 26 may alternatively be integral with the carrier 16. The cam bars 26 extend into a trench 30 that is formed in the mold half 12. The trench 30 defines the movement path of the slide assembly 14 in the mold half 12. A series of rollers 28 are arranged to engage with the carrier 16. In this case, the rollers 28 engage with the carrier 16 by engaging with the cam bars 26. The rollers 28 are recessed within the mold half 12 and roll with the movement of the carrier 16 parallel to the parting line of the two mold halves. The rollers 28 do not bear any of the compression force used to press the two mold halves together during part formation.

The rollers 28 themselves are not powered or driven in any way. Instead, they move with the cam bars 26 as the carrier 16 is moved in whichever direction the slide assembly 14 is actuated. This reduces the friction of the movement of slide assembly 14 as it actuates during part formation.

Figure 6:
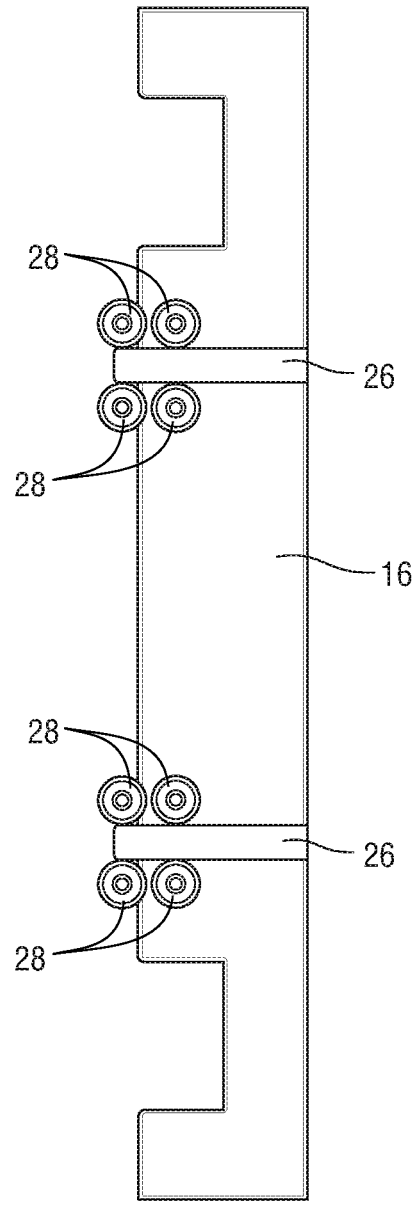
FIG. 6 is a bottom view of the carrier and select components of FIG. 5.

FIG. 6 shows a bottom view of the carrier 16 of FIG. 5 which better illustrates the arrangement of the rollers 28 relative to the carrier 16 and the cam bars 26. The actual number and orientation of the rollers 28 could be varied. There could be any number of rollers 28 and they do not have to be on both sides of the cam bars 26 as shown in the figures.

The combination of the rollers 28 and the cam bars 26 improves the alignment of the component parts of the slide assembly 14 as well as reduces the surface wear of the various parts. More accurately aligning these surfaces reduces the overall wear of the slide assembly 14 and potentially on molding surfaces that are mating on the slide faces.

FIG. 7 shows the bottom view of another carrier 16a with only one cam bar 26a. As with the earlier shown embodiment, there could be any number of rollers 28a and they do not have to be on both sides of the cam bar 26a.

FIG. 8 shows the bottom view of another carrier 16b in which there are no cam bars mounted to the carrier 16b. In this embodiment the rollers 28b are arranged on either side of the carrier 16b and would be located under the gibs (not shown). The rollers 28b would extend above the surface of the mold half (not shown) but because they would be located under the gibs, they would still not bear any compression force when the mold halves are pressed together.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A guidance system for a slide assembly for a mold for a plastic and/or silicone processing machine comprising:
    wherein the processing machine comprises at least two mold halves with at least one slide assembly mounted to at least one mold half;
    wherein the slide assembly is movable parallel to the plane of the parting line of the two mold halves and generally perpendicular to the direction of the plane of separation of the two mold halves after a part has been formed;
    said slide assembly comprising:
        a carrier for holding cavity forming parts;
        gibs that secure said carrier to the mold half;
        a series of rollers arranged to engage with said carrier such that said rollers roll with the movement of said carrier parallel to the parting line of the two mold halves and said rollers do not bear any of the compression force used to press the two mold halves together; and
    at least one cam bar mounted to said carrier.

2. The guidance system of claim 1 wherein said rollers engage with said cam bars to engage with said carrier.

3. The guidance system of claim 1 further comprising said rollers engage with said carrier.

4. The guidance system of claim 1 further comprising a wear plate mounted between said carrier and said mold half.

* * * * *